US007860602B2

(12) United States Patent
Rai

(10) Patent No.: US 7,860,602 B2
(45) Date of Patent: Dec. 28, 2010

(54) MAIL PROCESSING SYSTEM

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 998 days.

(21) Appl. No.: 11/442,823

(22) Filed: May 30, 2006

(65) Prior Publication Data

US 2007/0293981 A1 Dec. 20, 2007

(51) Int. Cl.
*G06F 7/00* (2006.01)

(52) U.S. Cl. ...................................... 700/223; 209/584

(58) Field of Classification Search ................. 700/224, 700/223; 209/583, 584

See application file for complete search history.

(56) References Cited

U.S. PATENT DOCUMENTS 6,337,451 B1 * 1/2002 De Leo ...................... 209/584
6,576,857 B1 * 6/2003 De Leo et al. .............. 209/584
2003/0155282 A1 * 8/2003 Kechel ....................... 209/584
2005/0125096 A1 * 6/2005 Kechel ....................... 700/224
2006/0180521 A1 * 8/2006 Edmonds .................... 209/584

* cited by examiner

*Primary Examiner*—Gene Crawford
*Assistant Examiner*—Ramya Prakasam
(74) *Attorney, Agent, or Firm*—Fay Sharpe LLP

(57) ABSTRACT

A mail processing system in which an estimated group of mail pieces is sorted in a mailroom area and delivered to a preset number of mailboxes is provided. The mail processing system includes a memory for storing information related to sorting and delivery and a processor that uses the sorting and delivery related information to determine, (i) an amount of time required to sort the estimated group of mail pieces, and (ii) an amount of time required to deliver the estimated group of mail pieces to the mail boxes. Operation of the mailroom may be evaluated by comparing a sum of the amount of time required to sort the estimated group of mail pieces and the amount of time required to deliver the estimated group of mail pieces to the preset number of mail boxes with an amount of time available for both sorting the estimated group of mail pieces and delivering the mail pieces to the preset number of mail boxes.

11 Claims, 3 Drawing Sheets

MAIL PROCESSING SYSTEM

BACKGROUND

The disclosed embodiments relate to a mail processing system in which the functionality of a mailroom is assessed to evaluate whether an estimated group of mail pieces can be delivered to a preset number of mailboxes in a timely manner.

A typical business entity, such as a corporation, may process its hardcopy mail by way of a two tiered process which mail pieces are sorted in accordance with a selected criterion, and then delivered to a plurality of mail sites, with each site or "stop," including one or more mailboxes. For many conventional mailroom operations, the United States Postal Service (USPS) provides the largest volume of incoming mail to be processed. Typical tasks may include receiving one or more mail tubs containing unsorted mail, performing a rough sort followed by a fine sort. Pursuant to the sorting process, mail may be put into alphabetical order (by name) to facilitate its delivery to the above-mentioned mail stops or similar delivery area.

In operation, a typical mailroom will assign associates or mail operators to perform the process of sorting and delivering regular USPS mail (such as first class and third class mail). In one known approach of operation, the sorting and delivery are performed serially. In a serial approach, one or more tubs of mail are delivered to a sorting area of the mailroom at a fixed time, such as 9:00 AM. A first group of one or more associates then performs a rough sort, in accordance with the selected criteria (e.g., by mail class and/or alphabetical order) to suitably group the mail for delivery. A second group of one or more associates (which may be the same as the first group of associates) then transports the sorted mail to one or more mail stops for placement of the same into individual slots or mailboxes. In turn, mail lacking sufficient information, such as an address, is returned to a sorting area.

It is understood that many mailrooms, by agreement, are obligated to have the USPS mail delivered by a selected time, e.g., have the USPS mail in the relevant mailboxes by 2:00 PM. Assuming the amount of incoming USPS mail received is constant on a day-by-day basis, then the above-described serial approach may be well suited for its intended purpose. Referring to FIGS. 1A and 1B, representing, in combination, an Individual and Moving Range chart showing fluctuating demand of incoming regular USPS mail in an exemplary mailroom is provided. As illustrated by the chart, over a period of over 20 days, the amount of incoming mail can vary considerably relative to a mean.

Figure 1:
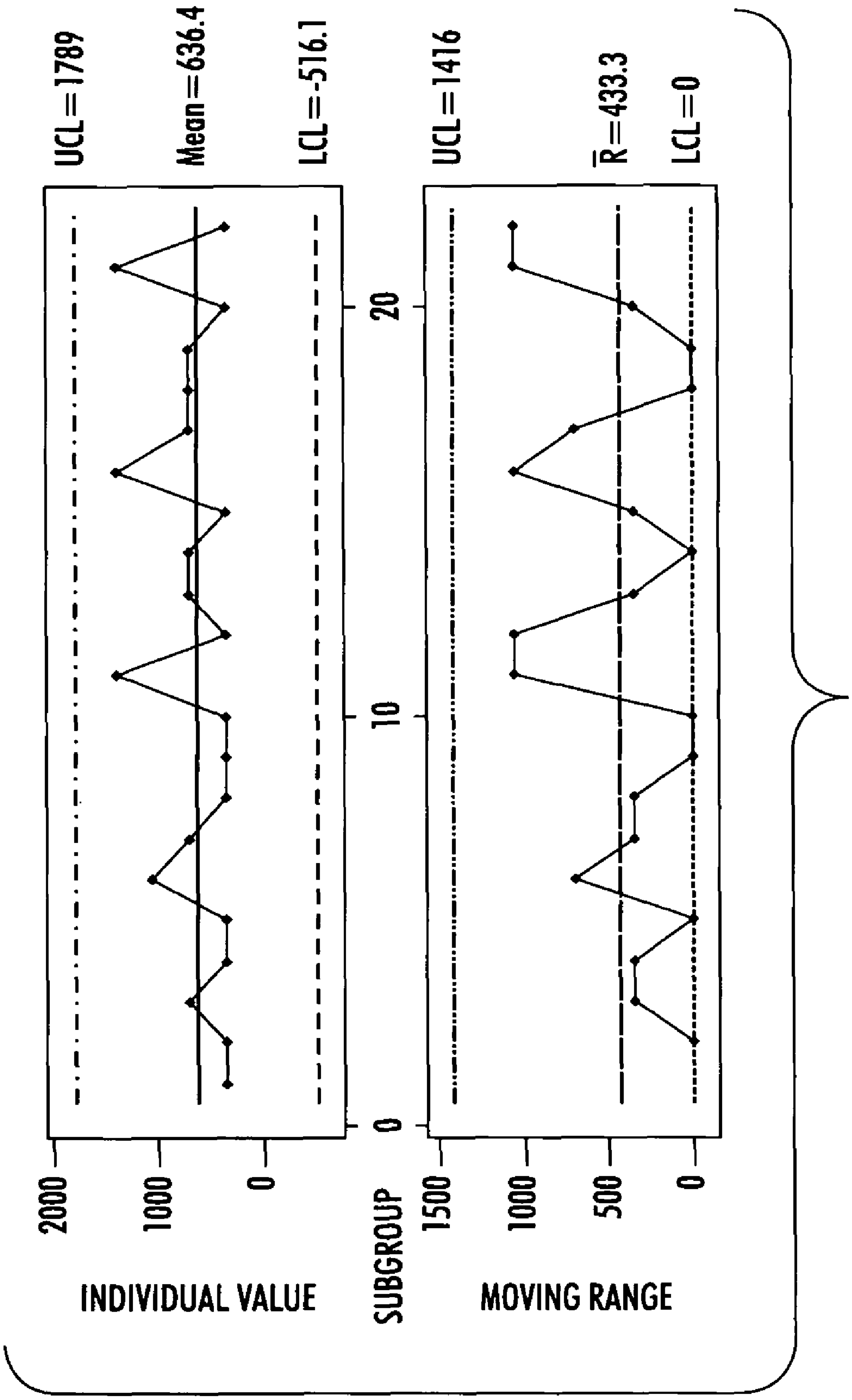

For the situation illustrated by FIG. 1, when volume is relatively high, late delivery can occur unless, for instance, either (a) more than the usual number of associates supports the sorting process in the serial approach, or (b) some delivery occurs in parallel with sorting. In either (a) or (b), substantial additional labor cost may be incurred. Moreover, considerable waste can be incurred in (b) unless the sorting process is suitably synchronized with the delivery process. For instance, if the allocation of associates to one of the processes is improper, then labor cost will inevitably be higher than necessary. It would be desirable to provide an improved mail processing system permitting proper structuring of the delivery and sorting processes.

In accordance with one aspect of the disclosed embodiments, there is provided a mail processing system in which an estimated group of mail pieces is sorted in a mailroom area and delivered to a preset number of mailboxes. The mail processing system includes: (a) a memory for storing information related to sorting and delivery, the sorting and delivery related information including (i) an estimate of a total quantity of mail pieces to be received at the mailroom, (ii) a sorting rate, (iii) an estimate of individual quantities of mail pieces to be delivered respectively to of the preset number of mail boxes, (iv) a rate of placement of the mail pieces in the preset number of mail boxes, and (v) a time required to travel between the mailroom and the preset number of mail boxes; (b) a processor, said processor using the sorting and delivery related information to determine, (i) an amount of time required to sort the estimated group of mail pieces, and (ii) an amount of time required to deliver the estimated group of mail pieces to the mail boxes; and (c) wherein operation of the mailroom is evaluated by comparing a sum of the amount of time required to sort the estimated group of mail pieces and the amount of time required to deliver the estimated group of mail pieces to the preset number of mail boxes with an amount of time available for both sorting the estimated group of mail pieces and delivering the mail pieces to the preset number of mail boxes.

In accordance with another aspect of the disclosed embodiments, there is provided a mail processing system in which an estimated group of mail pieces is sorted and delivered to a preset number of mailboxes. The mail processing system includes as well as a mailroom evaluation application running on the processor. The mailroom evaluation application includes a time control evaluation for determining a total time required to both sort the estimated group of mail pieces and deliver the estimated group of mail pieces to the preset number of mailboxes, said time control evaluation including a set of sorting and delivery related variables. In response to assigning respective values to the set of sorting and delivery variables, the processor compares the total time determined with the mailroom evaluation application with a pre-selected time availability value to determine whether the estimated group of mail pieces can be delivered to the preset number of mailboxes in a timely manner.

In accordance with yet another aspect of the disclosed embodiments, there is provided a method for processing mail in which an estimated group of mail pieces is sorted and delivered to a preset number of mailboxes. The method includes: (a) storing sets of time-related information in a memory, the sets of time related information including, (i) a first set of information relating to an amount of time required to sort the estimated group of mail pieces, and (ii) a second set of information relating to an amount of time required to deliver the estimated group of mail pieces to the mail stops; (b) storing in a memory a value corresponding with an amount of time available for both sorting the estimated group of mail pieces and delivering the estimated group of mail pieces to the preset number mailboxes; and (c) using a processor to, (i) determine, with the first set of information, a total mail piece sorting time, (ii) determine, with the second set of information, a total mail piece delivery time, and (iii) compare a sum of the total mail piece sorting time and the total mail piece delivery time with the value corresponding with the amount of time available to determine whether operation of the mail room is within the acceptable time range.

Figure 2:
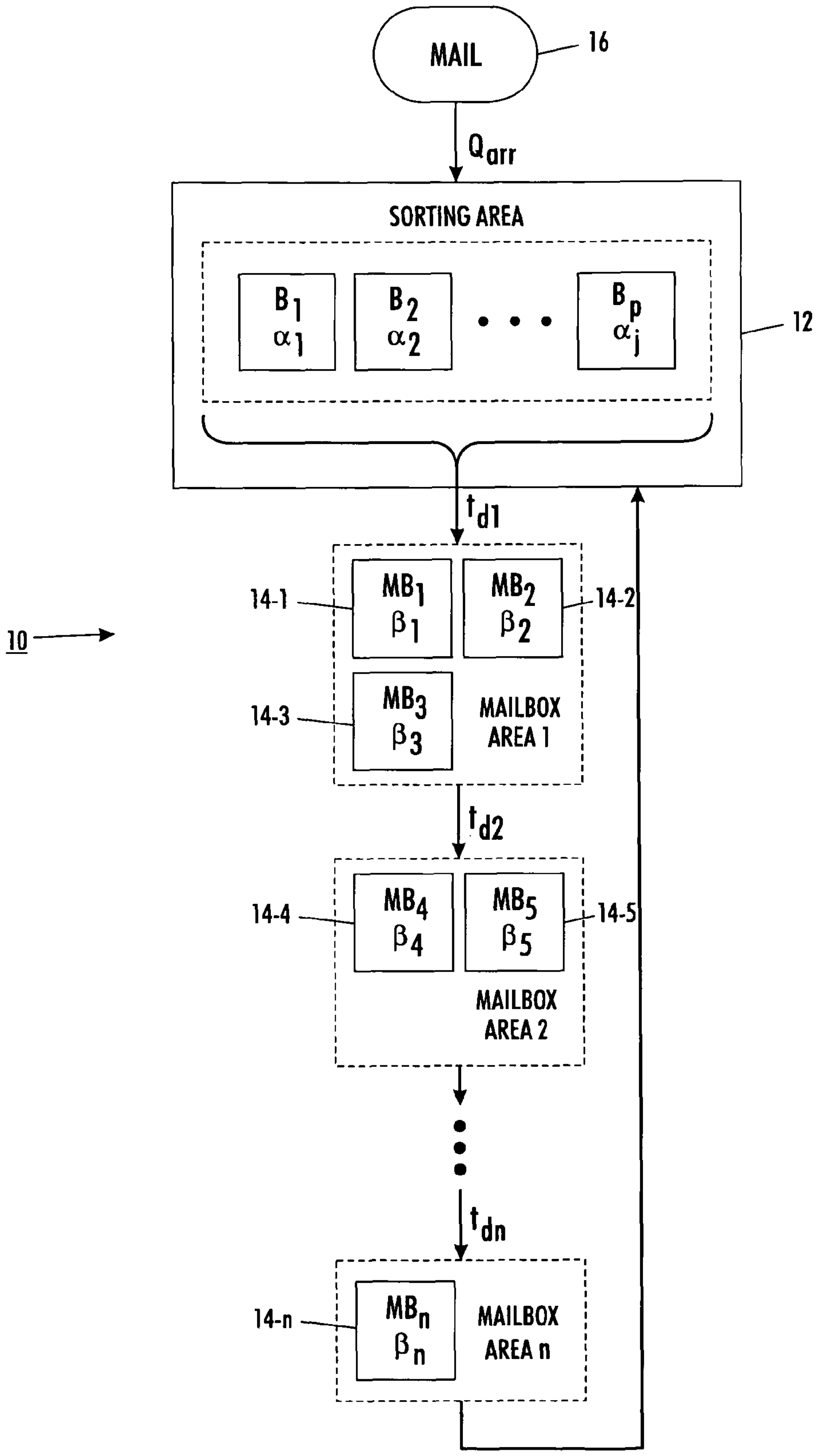
Figure 3:
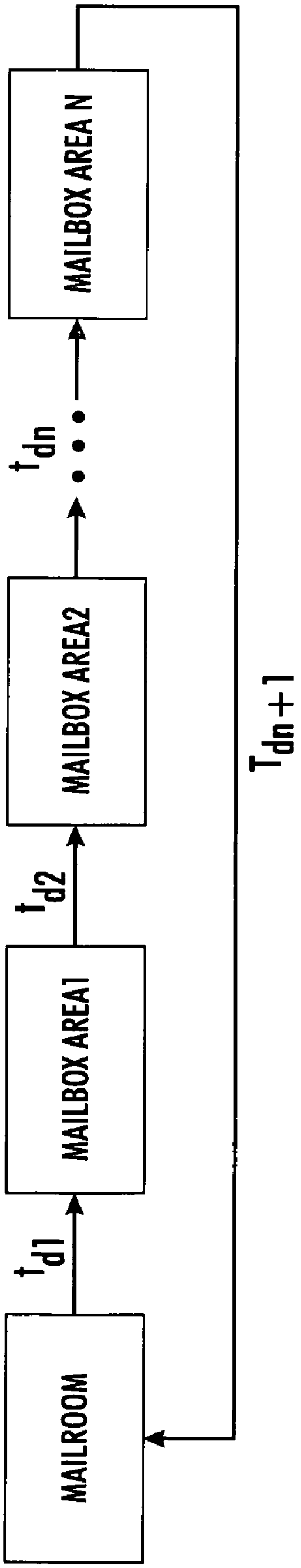

FIG. 1 includes an individual and moving-range (I-MR) chart of fluctuating demand for incoming regular USPS mail in an exemplary mailroom operations setting;

FIG. 2 is a block diagram of an exemplary mail processing system suitable for use with various disclosed embodiments; and FIG. 3 is a block diagram illustrating an exemplary layout of a serial transportation network of a series of mail-stops to which batches of mail-pieces are delivered.

Referring now to FIG. 2, an exemplary mail sorting/delivery system (hereinafter referred to simply as "mail system") in which the disclosed embodiments may be practiced is designated by the numeral 10. The mail system 10 includes a mailroom, designated by the numeral 12, and a plurality of mailboxes 14-*i*, where I=1,n. As shown, the mailboxes (each of which is represented in the form of "$MB_i$"), are arranged in n mailbox areas. As will be appreciated, the subsystems 12 and 14-*i* can be separated by relatively little or considerable distance. In one example, the mailroom is in one discrete area of a corporate "campus," while the mailboxes are distributed about the campus in what are sometimes referred to as "mail stops." The mail system 10 communicates with a conventional hardcopy mail (referred to hereinafter simply as "mail") source 16 such as a local branch of the United States Postal Service, from which the mail may delivered at selected times (e.g., each morning at a selected time) by conventional means to the sorting subsystem 12. In practice, the mail is sorted in the mailroom 12 and delivered (with the aid of "associates") to the mailbox areas.

In a general approach of mail delivery, $T_{total}$, the total amount of time required to sort and deliver $Q_{arr}$ mail pieces (i.e., the number of mail pieces arriving at the mailroom at a selected time), may vary as a function of sorting time ($T_{sort}$), the total time required to place $Q_{arr}$ mail pieces in n mail boxes ($T_{pm}$), and the time required to travel from the mailroom to the n mailboxes pursuant to delivering the mail pieces to the mailboxes ($T_{trav}$).

To determine $T_{sort}$, it may be assumed that $Q_{arr}$ can be sorted at a rate of $r_s$ mail pieces per hour. $Q_{arr}$ may be estimated by one of several approaches. In one example, incoming mail pieces would be provided to the mailroom 12 (FIG. 2) in tubs, with each tub being about the same size. Based on historical knowledge, the estimate of $Q_{arr}$ would be obtained through multiplying the typical number of mail pieces in each tub by the number of tubs.

To determine $T_{pm}$, the rate of putting sorted mail pieces into n mailboxes is denoted by a rate of $r_m$. Additionally, the individual quantity of mail pieces delivered to each $i^{th}$ mailbox is denoted as $q_i$. Accordingly, the value of $T_{pm}$ can be obtained by summing the term $q_i/r_m$ over the interval of 1 to n.

FIG. 3 comprises a block diagram illustrating an exemplary layout of a serial transportation network of a series of mail-stops to which batches of mail-pieces are delivered. It should be understood that each mailbox area or mail stop might include one or more mailboxes 14-*i*. As shown in FIG. 3, $t_{di}$ (where i=1,n) is the time required to deliver the mail pieces to n number of mailboxes. Depending on the distance from the nth mailbox to the mailroom, the value of $t_{dn+1}$ may or may not be trivial. In the presently described general approach, travel time is obtained by summing $t_{dn+1}$ over the interval of 1 to n.

In the general approach, $T_{total}$ may be solved with the following formula (1):

$$T_{total} = T_{sort} + \sum_{i=1}^{n} \frac{q_i}{r_m} + \sum_{i=1}^{n} t_{di} \tag{1}$$

The general approach can be solved with suitable software (such as an Excel application ("Excel" a trademark used by Microsoft Corp.)) running on a suitable processing platform, and can be very effective in determining if the $Q_{arr}$ mail pieces can be sorted and delivered within a given time constraint. In one example, a constraint would include $T_{total} < T_{avail}$ where $T_{avail}$=the amount of time allotted for both sorting and delivery of the $Q_{arr}$ mail pieces. As is known, $T_{avail}$ may be provided by a service level agreement (SLA), the SLA setting the latest time at which the mail pieces are to be placed in the n mailboxes. For those instances in which $T_{total} \geqq T_{avail}$, however, it has been found that modifying equation (1), to accommodate for several other variables, can be very helpful in resolving how to meet the given time constraint.

The following describes a detailed approach for determining $T_{total}$:

Referring to FIGS. 2 and 3, in the detailed approach, at least one mailroom associate sorts one batch of mail pieces (e.g., batch 2 ($B_2$) while at least one other associate picks up another batch of mail pieces (e.g., batch 1 ($B_1$) to start the delivery process. However since $q_i$ is known only after the entire sorting process is completed, it is difficult to estimate what batch size to split the overall sorting process into for simultaneous sorting and delivery. As a simplifying assumption in the detailed approach, historical data may be used to determine how a randomized batch volume is to be split or distributed across n mailboxes. The fractional allocation for the number of mail pieces typically received at an $i^{th}$ one of the mailboxes is denoted by $\beta_i$. While, in reality, $\beta_i$ is stochastic random variable, it has been found that a meaningful value for $T_{total}$ can be obtained by assuming that $\beta_i$ has a fixed value for each mailbox. It is understood that the value of $\beta_i$ for each $i^{th}$ mailbox can vary within a range and, for each $i^{th}$ mailbox, a conservative approach of setting $\beta_i$ at an upper spec limit is taken.

It is further assumed, in the detailed approach, that $\alpha_i$ denotes the fraction of mail pieces that are distributed across each batch, and that the $Q_{arr}$ mail pieces are sorted into p batches. Also, the detailed approach accommodates for labor allocation by assuming that $M\_s_j$ associates sort p batches while $M\_d_j$ operators deliver sorted mail pieces to n mailboxes. If the detailed approach is to satisfy the available hours constraint (where $T_{total}$ (also referred to as "makespan") $< T_{avail}$), it can be expressed by the following function or equation (2):

$$\alpha_1 Q_{arr} / M\_s_1 r_2 + \mathrm{Max}\left( \sum_{j=2}^{p} \alpha_j Q_{arr} / M\_s_j r_s, \sum_{j=1}^{p} \left( \sum_{i=1}^{n} \frac{\beta_i(\alpha_j Q_{arr})}{M\_d_j r_m} + \sum_{r=1}^{n+1} t_{di} \right) \right) <= T_{avail} \tag{2}$$

The following equations (3)-(8) serve as constraints with respect to the above equation (2):

$$\sum_{j=1}^{p} \alpha_j = 1 \tag{3}$$

$$M\_s_j + M\_d_j \leqq M \tag{4}$$

where M is the maximum number of associates available for sorting/delivery $$0 < p < p_{max} \tag{5}$$

$$p = \text{integer} \tag{6}$$

$$M\_s_j = \text{integer} \tag{7}$$

$$M\_d_j = \text{integer} \tag{8}$$

In view of the desirability of minimizing the amount of labor required to perform sorting/delivery, and yet still satisfy the constraint of equation 2, the detailed approach contemplates use of the following labor hours function or labor requirement evaluation of equation (9):

$$H = \sum_{j=1}^{p} \alpha_j Q_{arr} / r_s + \sum_{j=1}^{p} \left( \sum_{i=1}^{n} \frac{\beta_i (\alpha_j Q_{arr})}{r_m} + \text{M\_d}_i \sum_{i=1}^{n+1} t_{di} \right) \tag{9}$$

Referring specifically to equation (9), the decision variables are, in one instance, the p coefficients, namely $\alpha_j$ and the associate or operator allocation per batch, namely $\text{M\_s}_j$ and $\text{M\_d}_j$. In total there will be 3p design variables subject to the constraint set (2)-(8). Pursuant to use of the detailed approach, decision variables that minimize Equation (9) can be found. Clearly, if no time constraint existed such as that specified by equation (2), then the solution that minimizes equation (9) would be p=1, $\alpha_1$=1 and $\text{M\_d}_1$=1. However, to satisfy the timeliness constraint of equation (2), the mail pieces or jobs are split into multiple batches and multiple operators are allocated. Solving equation (9), as proposed above, is a discrete nonlinear optimization problem. An exemplary approach for handling this type of problem follows:

Example:

$Q_{arr}$=800 mail pieces $r_s$=800 pieces/h $r_m$=400 pieces/h n=3 mail boxes $t_{d1}=t_{d2}=t_{d3}$=0.1 h $t_{d4}$=0.2 h M=3 operators $\beta_1=\beta_2=\beta_3$=0.5

$p_{max}$=2 batches.

$T_{avail}$=2.5 h

The optimization problem is a mixed discrete integer-programming problem with integer and continuous decision variables. As contemplated in the detailed approach, the problem, as follows from the description below, may be solved in two phases.

Referring still to the Example above, the discrete operator allocation decision variable may be solved by enumeration. If there are M operators and $p_{max}$ batches; then for every batch there are M(M−1) options of allocating labor to the sorting and delivery tasks. For $p_{max}$ batches there are $(M(M-1))^p$ options of allocating labor. Assuming a maximum of 10 associates available for the task, and a maximum of 3 batches; then the number of options that would be enumerated are $90^3$=729000. For each option, a linear programming problem in $\alpha_j$ is solved to get the optimal value of $\alpha_j$. The value of $\alpha_j$ that minimizes (9) is the one that can be selected.

For the Example, 36 $(\{(3)(2)\}^2)$ scenarios are enumerated. Some of these scenarios (with results obtained by solving equations (2)-(9)), and where a first batch is designated as $B_1$ and a second batch is designated as $B_2$) are listed below:

| | $B_1$ | $B_2$ |
|---|---|---|
| Scenario 1: | | |
| M_s | 2 | 1 |
| M_d | 1 | 2 |
| H = 3.5 h | | |
| Makespan = 1.719 h | | |
| Optimal allocations: | | |
| $\alpha_1 = 0.1; \alpha_2 = 0.9$ | | |
| Scenario 2: | | |
| M_s | 1 | 1 |
| M_d | 1 | 1 |
| H = 3 | | |
| Makespan = 2.372 | | |
| Optimal allocations: | | |
| $\alpha_1 = 0.1; \alpha_2 = 0.9$ | | |

Each one of the above scenarios is feasible and capable of meeting customer requirements (where $T_{total}$ or makespan<$T_{avail}$), but the second scenario is selected because it requires less labor. It will be appreciated that while only two scenarios were considered above, a computer could readily run through a relatively large number of scenarios (solving equations (2)-(9), as required) in a relatively short time interval. Additionally, the above description anticipates, through the use of a two step process of enumeration and linear programming, a tool for both evaluating the feasibility of a given labor allocation and of optimizing it.

Referring to the results provided immediately below, an implementation of the above-described algorithm (based on the conjunctive solution of equations (2)-(9)), using Excel solver ("Excel" is a trademark used by Microsoft Corp.) is shown. While the solver may not be particularly well suited for jointly optimizing the labor allocation and job allocation problem described above, the above approach of using enumeration coupled with a linear programming approach to solve the job allocation problem converges quickly.

| | | | | | | |
|---|---|---|---|---|---|---|
| Problem variables | | | | | | |
| $Q_{arr}$ | 800 | | | | | |
| $r_s$ | 800 | | | | | |
| $r_m$ | 400 | | | | | |
| n | 3 | | | | | |
| $t_{di}$ | 0.1 | 0.1 | 0.1 | 0.2 | | |
| M | 3 | | | | | |
| $\beta_i$ | 0.33 | 0.33 | 0.34 | | | |
| $p_{max}$ | 2 | | | | | |
| $T_{avail}$ | 2.5 | | | | | |
| Design variables | $B_1$ | $B_2$ | | | | |
| $\alpha_i$ | 0.1 | 0.9 | | | | |
| M_s | 1 | 1 | | | | |
| M_d | 1 | 1 | | | | |
| Constraints | | | | | | |
| M_d + M_s <= M | 2 | 2 | | | | |
| Total Time < Tavail | | | | | | |
| Sorting time | | | 0.1 | 0.9 | | |
| Mail stop delivery time per batch | | | | 0.066 | 0.594 | 0.612 |
| | | | | 0.594 | 0.594 | 0.612 |
| Travel Time | | | | 0.5 | | |
| Total Makespan | 2.372 | | | | | |

-continued

| | | | | |
|---|---|---|---|---|
| Sorting labor time | 1 | | 0.1 | 0.9 |
| Delivery labor time per batch | 0.066 | 0.066 | 0.068 | |
| | 0.594 | 0.594 | 0.612 | |
| Total labor time | 3 | | | |

The above-described solutions can be implemented in several ways to provide a tool that, among other things, allocates labor and performs scheduling policy in a mailroom environment. In one example, the tool might comprise a web-hosted solution running on a "fast" platform.

The above description relates to, several approaches for improving the operation of a mailroom, e.g., whether the time required to sort and deliver an estimated group of mail pieces ($T_{total}$) is less than or equal to an allotted or available time ($T_{avail}$). In one approach, information related to sorting and delivery is stored in memory and a suitable platform or processor is used to calculate (i) an amount of time required to sort the estimated group of mail pieces, and (ii) an amount of time required to deliver the estimated group of mail pieces to a preset number of mail boxes. In turn, evaluation can be achieved by comparing the sum of (i) and (ii) with $T_{avail}$.

Use of certain enhancements in determining if $T_{total} < T_{avail}$ is contemplated. For instance, the estimated group of mail pieces can be sorted into p batches, and distribution information, indicating how the mail pieces are to be allocated across the p batches ($\alpha_j$) may be provided. Further distribution information (including $\beta_i$) can be used to estimate a fractional allocation of mail delivery typically encountered at each mailbox.

The disclosed approaches accommodate for labor utilization by respectively corresponding integer values to a sorting group ($M\_s_j$) and a delivery group ($M\_d_j$). In one exemplary constraint, the sum of these integers is no greater than an integer value M.

In another approach, a timeliness function, including several applicable variables, is used to calculate $T_{total}$. The timeliness function can be solved in conjunction with a labor hours function to minimize the number of hours required to sort and deliver the estimated group of mail pieces. It has been found that this conjunctive solution can be advantageously implemented by enumeration coupled with a linear programming, and that such implementation can be readily achieved with "off-the-shelf" software.

In yet another approach a time control evaluation or function can be advantageously solved with a labor control evaluation or function to assess and/or optimize the amount of labor time required to both sort the estimated group of mail pieces and deliver the same to a preset number of mailboxes.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A mail processing system in which an estimated group of mail pieces is sorted in a mailroom area and delivered to a preset number of mail boxes, comprising:

(a) a memory for storing information related to sorting and delivery, the sorting and delivery related information including (i) an estimate of a total quantity of mail pieces to be received at the mailroom, (ii) a sorting rate, (iii) an estimate of individual quantities of mail pieces to be delivered respectively to the preset number of mail boxes, (iv) a rate of placement of the mail pieces in the preset number of mail boxes, and (v) a time required to travel between the mailroom and the preset number of mail boxes;

(b) a processor, said processor using the sorting and delivery related information to determine, (i) an amount of time required to sort the estimated group of mail pieces, and (ii) an amount of time required to deliver the estimated group of mail pieces to the mail boxes; and (c) wherein operation of the mailroom is evaluated by comparing a sum of the amount of time required to sort the estimated group of mail pieces and the amount of time required to deliver the estimated group of mail pieces to the preset number of mail boxes with an amount of time available for both sorting the estimated group of mail pieces and delivering the mail pieces to the preset number of mail boxes.

2. The mail processing system of claim 1, in which the estimated group of mail pieces are distributed across p number of batches, wherein the p number is part of the sorting and delivery related information stored in said memory.

3. The mail processing system of claim 2, in which distribution information indicating how the estimated group of mail pieces is to be allocated across the p number of batches is provided, wherein the distribution information is part of the sorting and delivery related information stored in said memory.

4. The mail processing system of claim 1, in which distribution information indicating how delivery of the estimated group of mail pieces is to be allocated across the preset number of mailboxes is provided, wherein the distribution information is part of the sorting and delivery information stored in said memory.

5. The mail processing system of claim 1, in which the estimated group of mail pieces is sorted by a first group of persons, wherein an integer value corresponding with the first group of persons is stored in said memory as part of the sorting and delivery related information.

6. The mail processing system of claim 5, in which the estimated group of mail pieces is delivered by a second group of persons, wherein an integer value corresponding with the second group of persons is stored in said memory as part of the sorting and delivery related information.

7. The mail processing system of claim 6, in which an integer value M corresponds with a number of persons available to both sort and deliver the estimated group of mail pieces, wherein a sum of the number of persons in the first group and the number of persons in the second group is no greater than the integer value M.

8. The mail processing system of claim 1, wherein said processor uses the following timeliness function, with the sorting and delivery related information, to evaluate mailroom operation:

$$T_{total} = \alpha_1 Q_{arr} / \mathrm{M\_s}_1 r_2 + \mathrm{Max}\left(\sum_{j=2}^{P} \alpha_j Q_{arr} / \mathrm{M\_s}_j r_s,\ \sum_{j=1}^{P}\left(\sum_{i=1}^{n} \frac{\beta_i(\alpha_j Q_{arr})}{\mathrm{M\_d}_j r_m} + \sum_{t=1}^{n+1} t_{di}\right)\right)$$

where, $T_{total}$=the total time required to sort and deliver $Q_{arr}$ mail pieces "Max" is an operator indicating that the greater of two terms in the argument is to be employed p=number of batches (groups of mail pieces) to be delivered to n number of mailboxes $\alpha_1$=the first fraction corresponding with a first batch of mail pieces $Q_{arr}$=number of mail pieces arriving at a mailroom at a selected time $M\_S_1$=an integer number persons or operators used to sort a first batch of mail pieces $r_s$=rate of mail pieces sorted per hour $\alpha_i$=the $j^{th}$ fraction corresponding with a $j^{th}$ batch of mail pieces $M\_S_j$=an integer number of operators used to sort a jth batch of mail pieces $\beta_i$=the fractional allocation for mail pieces delivered to the $i^{th}$ mailbox $M\_d_j$=an integer number of operators used to deliver p batches of mail pieces $t_{di}$=the time required to deliver the $Q_{arr}$ mail pieces to n number of mailboxes.

9. The mail processing system of claim 8, wherein the following labor hours function is used in conjunction with the timeliness function, as well as the sorting and delivery related information, to evaluate mailroom operation:

$$H = \sum_{j=1}^{P} \alpha_j Q_{arr} / r_s + \sum_{j=1}^{P}\left(\sum_{i=1}^{n} \frac{\beta_i(\alpha_j Q_{arr})}{r_m} + M\_d_i \sum_{t=1}^{n+1} t_{di}\right)$$

where,

H=the number of hours required to sort and deliver $Q_{arr}$ mail pieces.

10. The mail processing system of claim 9, wherein values for $\alpha_i$ and $M\_d_j$ are selected in such a way that a resulting value for H is minimized.

11. A mail processing system in which an estimated group of mail pieces is sorted in a mailroom area and delivered to a preset number of mail boxes, comprising:

(a) a memory for storing information related to sorting and delivery, the sorting and delivery related information including (i) an estimate of a total quantity of mail pieces to be received at the mailroom, (ii) a sorting rate, (iii) an estimate of individual quantities of mail pieces to be delivered respectively to the preset number of mail boxes, (iv) a rate of placement of the mail pieces in the preset number of mail boxes, and (v) a time required to travel between the mailroom and the preset number of mail boxes;

(b) a processor, said processor using the sorting and delivery related information to determine, (i) an amount of time required to sort the estimated group of mail pieces, and (ii) an amount of time required to deliver the estimated group of mail pieces to the mail boxes; and (c) wherein operation of the mailroom is evaluated by the following timeliness function, with the sorting and delivery related information:

$$T_{total} = \alpha_1 Q_{arr} / M\_s_1 r_s + \mathrm{Max}\left(\sum_{j=2}^{P} \alpha_j Q_{arr} / M\_s_j r_s, \sum_{j=1}^{P}\left(\sum_{i=1}^{n} \frac{\beta_i(\alpha_j Q_{arr})}{M\_d_j r_m} + \sum_{t=1}^{n+1} t_{di}\right)\right)$$

where, $T_{total}$=the total time required to sort and deliver $Q_{arr}$ mail pieces "Max" is an operator indicating that the greater of two terms in the argument is to be employed p=number of batches (groups of mail pieces) to be delivered to n number of mailboxes $\alpha_1$=the first fraction corresponding with a first batch of mail pieces $Q_{arr}$=number of mail pieces arriving at a mailroom at a selected time $M\_S_1$=an integer number persons or operators used to sort a first batch of mail pieces $r_s$=rate of mail pieces sorted per hour $\alpha_i$=the $j^{th}$ fraction corresponding with a $j^{th}$ batch of mail pieces $M\_S_j$=an integer number of operators used to sort a jth batch of mail pieces $\beta_i$=the fractional allocation for mail pieces delivered to the $i^{th}$ mailbox $M\_d_j$=an integer number of operators used to deliver p batches of mail pieces $t_{di}$=the time required to deliver the $Q_{arr}$ mail pieces to n number of mailboxes.

* * * * *